United States Patent
Lee (10) Patent No.: US 6,932,078 B2
(45) Date of Patent: Aug. 23, 2005

(54) BAMBOO GRID FOR BROILER (76) Inventor: Jae-Yeorl Lee, 287-3 Daechi-Ri, Daejun-Myun, Dangyang-Goon Junranam-Do (KR), 517-923

( * ) Notice: Subject to any disclaimer, the term of this patent is extended or adjusted under 35 U.S.C. 154(b) by 0 days.

(21) Appl. No.: 10/737,073

(22) Filed: Dec. 16, 2003

(65) Prior Publication Data
US 2005/0011510 A1 Jan. 20, 2005

(30) Foreign Application Priority Data

| Jul. 16, 2003 | (KR) | 20-2003-0023052 |
| Jul. 24, 2003 | (KR) | 20-2003-0023910 |
| Oct. 2, 2003 | (KR) | 20-2003-0031075 |

(51) Int. Cl.$^7$ .............................. A47J 37/06; F24B 3/00
(52) U.S. Cl. ................... 126/25 R; 126/9 A; 99/393; 99/400
(58) Field of Search ............... 126/25 R, 1 R, 126/19 R, 9 R, 9 A; 99/393, 450, 446, 444, 400

(56) References Cited

U.S. PATENT DOCUMENTS

| 2,772,627 A | * | 12/1956 | Newell ................. 126/9 A |
| 3,172,402 A | * | 3/1965 | Valicla ................. 126/25 R |
| 3,353,527 A | * | 11/1967 | Anderson ............. 126/25 R |
| 4,778,687 A | * | 10/1988 | Kikuchi ................. 426/412 |
| 5,669,290 A | * | 9/1997 | Natsumi et al. ......... 99/421 H |
| 5,896,903 A | * | 4/1999 | Chen et al. ............. 144/350 |
| 6,205,912 B1 | * | 3/2001 | Chiu ..................... 99/400 |

FOREIGN PATENT DOCUMENTS

| KR | 2002073470 A | * | 9/2002 | ............. A47J/37/06 |
| KR | 2003018624 A | * | 6/2003 | ............. A47J/37/06 |

* cited by examiner

Primary Examiner—Josiah C. Cocks
(74) Attorney, Agent, or Firm—GWiPS (57) ABSTRACT A bamboo grid for a barbecue grill is introduced, which comprises a plurality of natural bamboo strips, a pair of end retainers and a grid mounting set having a metal frame and a pair of grid mounting plates for mounting the grid set. An arch-shaped bamboo grid set has a plurality of bamboo strips, a pair of end retainers, clip array, and a grid mounting set having a rectangular steel frame, bandies and grid mounting plates for mounting the bamboo grid. A bent mounting set comprises a steel frame, a bent mounting plate and a pair of braces at both sides for mounting the disposable bamboo grids. A narrow bamboo strip is sliced from a natural bamboo stalk and the surface is carved with various decorative incisions not only for decorating, but also for extracting bamboo sap and allowing it to permeate into the cooking meat during broiling.

11 Claims, 8 Drawing Sheets

BAMBOO GRID FOR BROILER

BACKGROUND OF THE INVENTION

1. Field of the Invention

The present invention relates to a grid made of natural bamboo strips to use on a barbeque grill. More particularly, the bamboo grid is formed with a plurality of narrow strips of natural bamboo that are carved with various decorative incisions through which bamboo sap will be extracted and permeated into the meat during broiling. The bamboo grid is prefabricated with a special treatment for ready use.

2. Related Prior Art

Generally, the conventional barbeque grill employs a steel grid above burning charcoal for broiling the food. The temperature of the burning charcoal is high enough to instantly overcook or burn the barbecued food. Most steel grids have many disadvantages because they easily build up blackened and burned oily meat debris, which are unsanitary. The food barbecued on an uncleaned steel grid may not be hygienic enough as a result of contamination by leftover oily residue. Furthermore, it is well known that eating burned meat may contribute to the development of cancer in the human body. Some people try to clean up the steel grid before using it. However, it is an unpleasant and burdensome task to remove the long-term deposited oily burned meat debris. To overcome these drawbacks, a high grid is developed. However, it does not solve the problems of burning meat. Therefore, a disposable grid is suggested to eliminate these kinds of problems.

Furthermore, most conventional grids made of wires are directly exposed above the open flame. If the oily fluid discharged from the cooking meat during broiling occasionally drips directly onto the open flames, it generates more fumes and odors. To avoid these occurrences, many special configurations of grid are designed. However, a simple design is adopted in this invention to solve this problem. If the heat source is divided to both sides or arranged in the center to provide open spaces in the grill and an inclined or declined grid is adopted, the oily fluid is possibly collected at the center or both sides of the grill after dripping into the collecting pan.

In view of the above, it is a prime objective to design an advanced, sanitary disposable bamboo grid, which can mitigate the above drawbacks.

SUMMARY OF THE INVENTION

In order to overcome the aforementioned disadvantages, a new concept of a bamboo grid for a barbeque grill is hereby introduced.

An objective of the present invention is to provide a bamboo grid comprising a plurality of natural bamboo strips, end retainers and a grid mounting set having a metal frame and a pair of grid mounting plates for mounting the grid set.

The grid set consists of an arch-shape bamboo grid and a grid mounting set. The arch-shaped bamboo grid consists of a plurality of bamboo strips, a pair of end retainers and a clip array. The grid mounting set has a rectangular steel frame, a pair of handles and grid mounting plates for mounting the bamboo grid. The end retainers made of stainless steel are formed into a U-shape for forcibly and tightly clamping both ends of the bamboo strips to prevent unnecessary movement of said bamboo strips during the broiling of meat. The arch-shaped bamboo grid is assembled in the manner that the outer surface of the natural bamboo faces upward and the inner surface of the natural bamboo is bent downward and fixed to the clip array at center. The lowest point of the arch-shaped bamboo grid is in the center, to collect the extracted oily and juicy fluid at the center bottom to fall in an oil-collecting pan.

Another objective of the present invention is to provide the grid mounting set having a rectangular steel frame with a handle, a pair of grid mounting plates disposed at opposite ends of the longer side of the frame for mounting the bamboo strips, a cross rod located at the center of the shorter side of the frame, the grid mounting plates forming a plurality of slots and bamboo strip retainers. The rectangular steel frame is slightly bent up from the cross bar located at center toward both grid mounting plates disposed at opposite ends of the longer side of the frame, so that one end of the bamboo strips is manually inserted underneath the cross bar and both ends of the bamboo strips are slightly bent up for forcibly inserting between the bamboo strip retainers to form an arch-shape. The plurality of bamboo strip retainers fixedly retains the ends of the bamboo strips for preventing unnecessary movement of the bamboo strips during the broiling of meat. A pair of disposable bamboo grids is pre-fabricated with a plurality of bamboo strips arranged in parallel at uniform intervals by a pair of u-shape end retainers for clamping both ends of the bamboo strips, and vacuum packed to preserve the natural bamboo freshness for ready use. The disposable bamboo grids are mounted on a bent down mounting set comprising a steel frame, a pair of grid mounting plates at opposite sides and braces at both ends. A bent up mounting set is also provided to mount the disposable bamboo grids, which comprises a steel frame, a bent-up mounting plate at top center and a pair of braces at both end sides.

DETAILED DESCRIPTION OF THE PREFERRED EMBODIMENTS

To achieve the aforementioned objectives, a new concept of a grid made of natural bamboo strips is introduced for effectively and deliciously broiling meat.

Generally speaking, all kinds of wood including bamboo are definitely burned in the high temperature flame. However, if the flame temperature is controlled and maintained below the burning point of the bamboo, but the temperature is hot enough to broil the meat, bamboo is possibly an ideal material to make a grid for cooking meat. Therefore, this concept of the temperature difference between the burning point of bamboo and the cooking temperature of the meat is applied to produce a bamboo grid of the present invention.

A conventional broiling device for cooking meat is commonly comprised of a heating source such as a charcoal or natural gas burner or electrical heater, a cooking metal grid, an oil or juicy droplet removal container, an air or fume ventilating system and a grilling oven with a cover.

Figure 17:
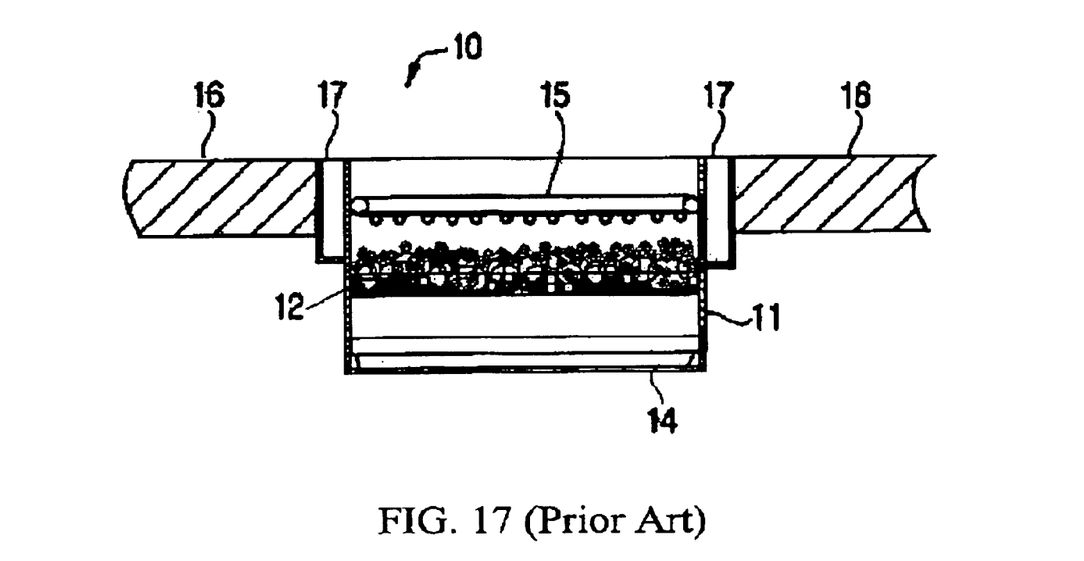
FIG. 17 is a conventional Korean barbeque grill employing a metal grid set.

Referring to FIG. 17. a Korean traditional barbeque (BBQ) grill (10) comprises an oven lower part (11) under a dining table (16), a burning charcoal container as the primary heat sources (12), a cover or lid (13), an oil or liquid droplet collecting pan (14), a metal cooking grid (15) and a ventilation system (17).

Figure 1:
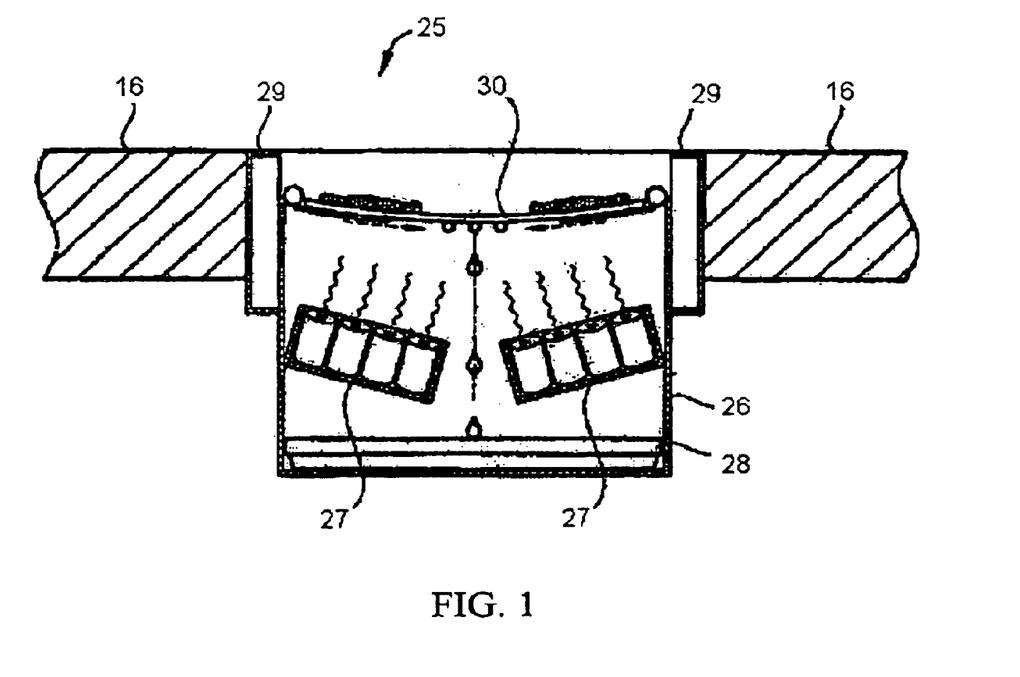
FIG. 1 is a new concept of Korean barbeque grill employing a bamboo grid set of the present invention.

However as shown in FIG. 1, a new design of a Korean barbeque (BBQ) grill (25) comprises an oven lower part (26) under a dining table (16), a pair of burning charcoal container as the primary heat source (27), a cover or lid, an oil or liquid droplet collecting pan (28), a bamboo grid (30) and a ventilation system (29).

The charcoal which is commonly formed in a hexagonal or cylindrical shape with a hollow core is used as the primary fuel for the Korean traditional instant BBQ grill. When the charcoal is actively burned, it radiates strong heat waves without an open flame. The radiated heat waves are hot enough to cook the meat without burning the bamboo grid, which is commonly considered a combustible material.

The fumes and cooking odors are exhausted through an overhead hood and ventilation fan installed above the BBQ grill. The modern ventilating system is installed around the cooking grid on the dining table to suck out and exhaust the fumes underneath the table.

Natural gas or electricity may also be applied as a fuel in the instant BBQ system. For using natural gas, additional devices, such as a gas burner and heat wave reflector are required to generate the heat radiating waves which will avoid burning the bamboo. To apply electricity as a heating source, additional devices are also required, such as an electric heater and heat wave reflecting device to generate the heat radiating waves which will avoid burning the bamboo.

Figure 2:
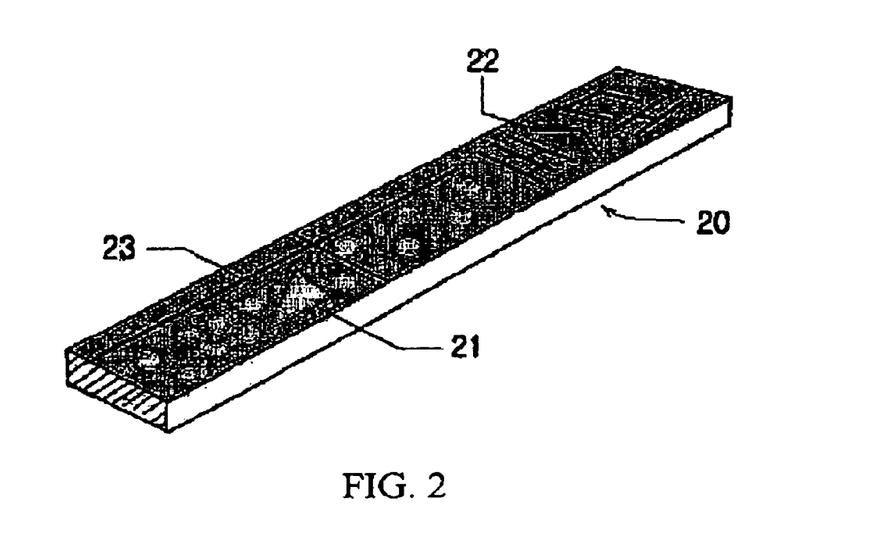
FIG. 2 is a piece of bamboo strip that is carved with various decorative incisions.
Figure 3:
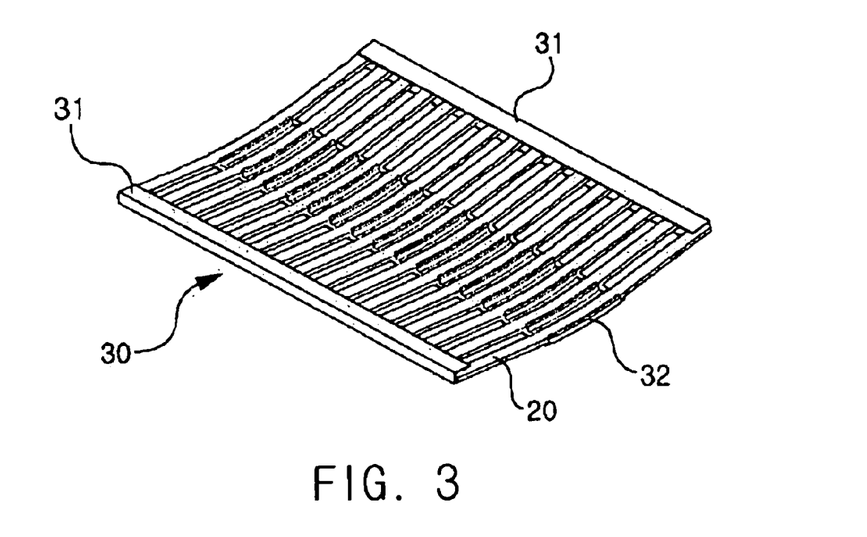
FIG. 3 is an arch-shaped bamboo grid of the first embodiment of the present invention.
Figure 4:
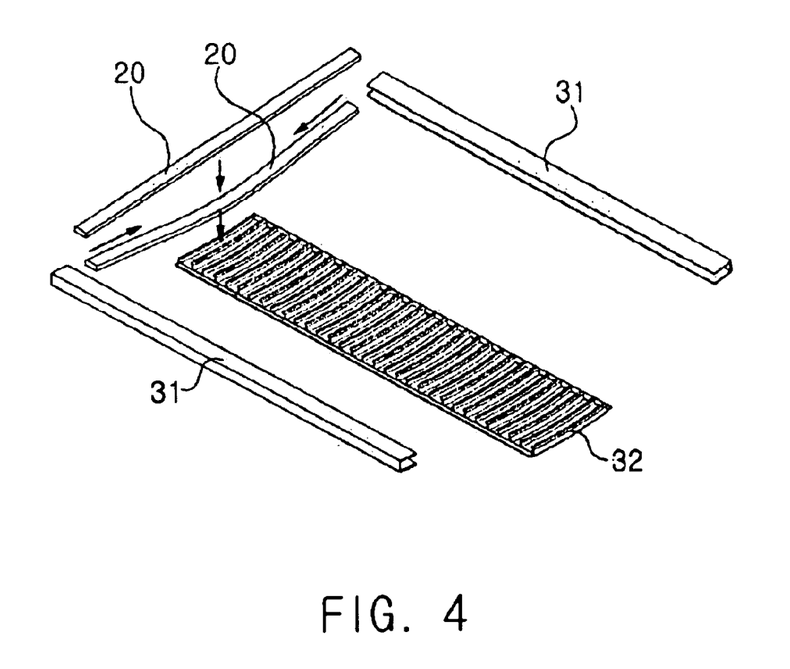
FIG. 4 is a disassembled arch-shaped bamboo grid of the first embodiment of the present invention.
Figure 5:
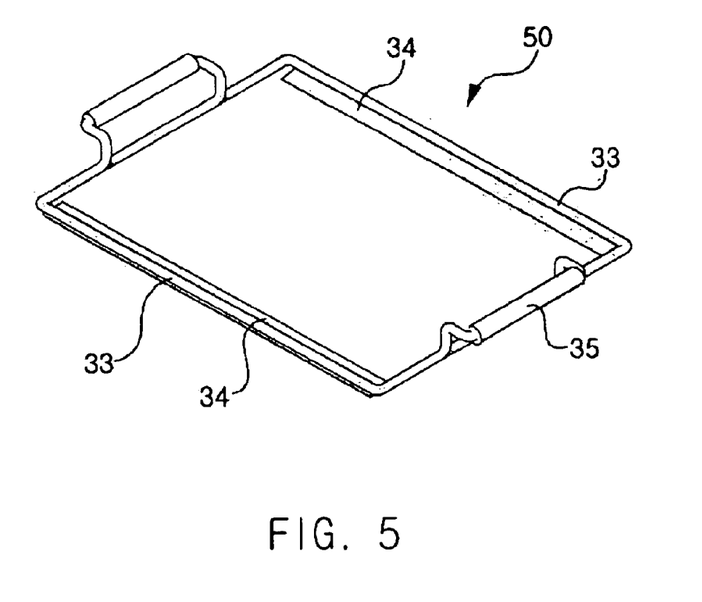
FIG. 5 is a grid mounting set of the first embodiment of the present invention.

As shown in FIG. 2, a narrow bamboo strip (20) is produced from a natural bamboo stalk by slicing it to a width of approximately 6~10 mm (¼"~½"), a thickness of 6 mm (¼") and a length of 200~400 mm (8"~16"). The surface of the bamboo strip may be carved with various decorative incisions. It could be letters, commercial logos (22) or figures (21), such as dots, lines (23) or pictures. The purpose of carving the bamboo strip surface is not only for decorating, but also for extracting bamboo sap and allowing it to permeate into the meat while the meat is broiling.

Figure 6:
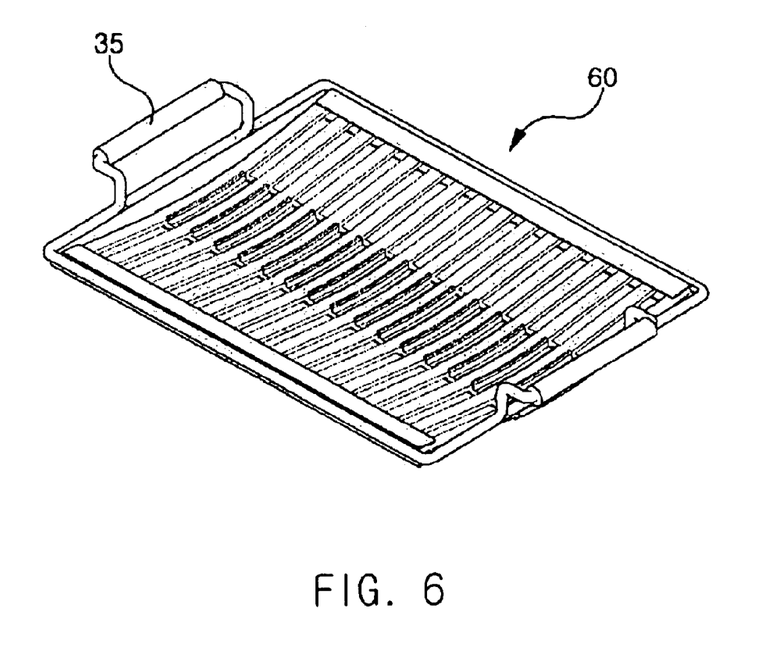
FIG. 6 is the bamboo grid set in which the arch-shaped bamboo grid is mounted on the grid mounting set.

As seen in FIGS. 3 through 6, an embodiment of the arch-shaped bamboo grid of the present invention is introduced. The arch-shaped bamboo grid (30) comprises a plurality of bamboo strips (20), a pair of end retainers (31) and a clip array (32). The end retainers (31), usually made of stainless steel, are formed into a U-shape for clamping the ends of the bamboo strips (20). Both ends of the bamboo strips (20') are forcibly and tightly inserted into the end retainers (31). The assembly is performed in the manner that the outer surface of the natural bamboo faces upward and the inner surface of the natural bamboo is bent downward and fixed to a clip array (32) at the center. A grid mounting set (50) consists of a rectangular steel frame (33), a pair of handles (35) and grid mounting seats (34) for mounting the bamboo grid (30). As shown in FIG. 6, the final assembly (60) of the arch-shaped bamboo grid (30) is bent down at the center to collect the extracted oily or juicy fluid, so that the droplets of the fluid flow down to the center bottom part and fall into the oil-collecting pan.

Figure 7:
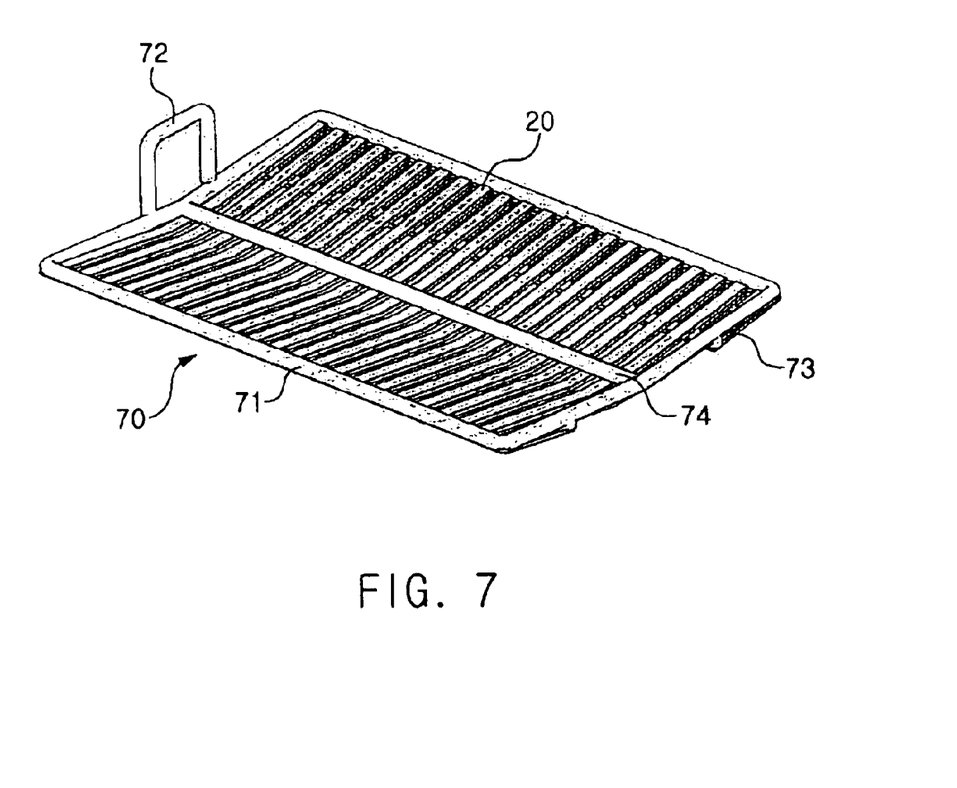
FIG. 7 is another arch-shaped bamboo grid set of the second embodiment of the present invention.
Figure 8:
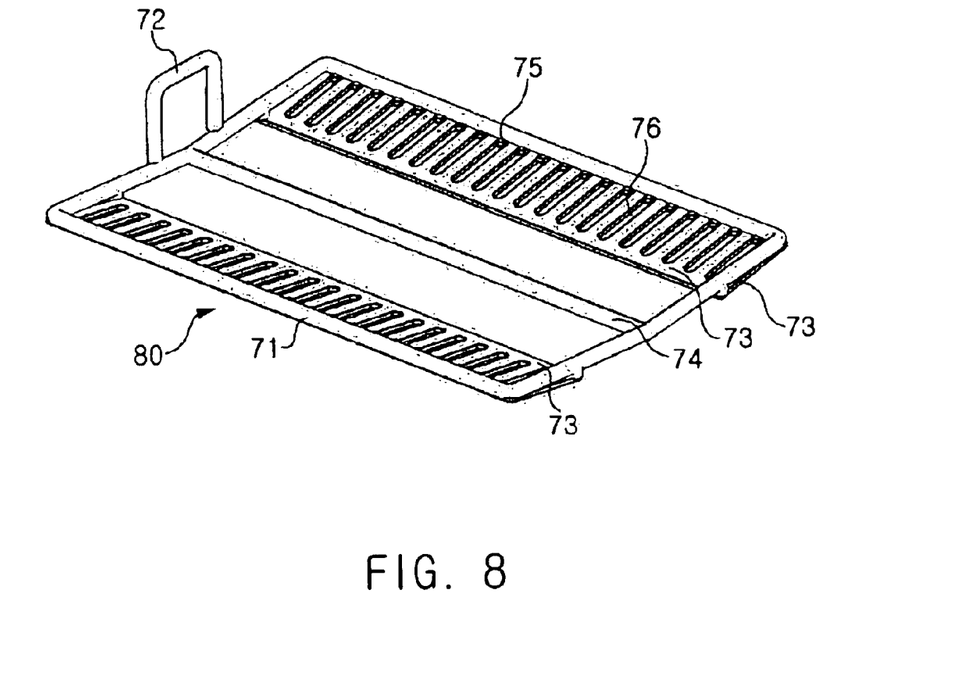
FIG. 8 is another grid mounting set of the second embodiment of the present invention.
Figure 9:
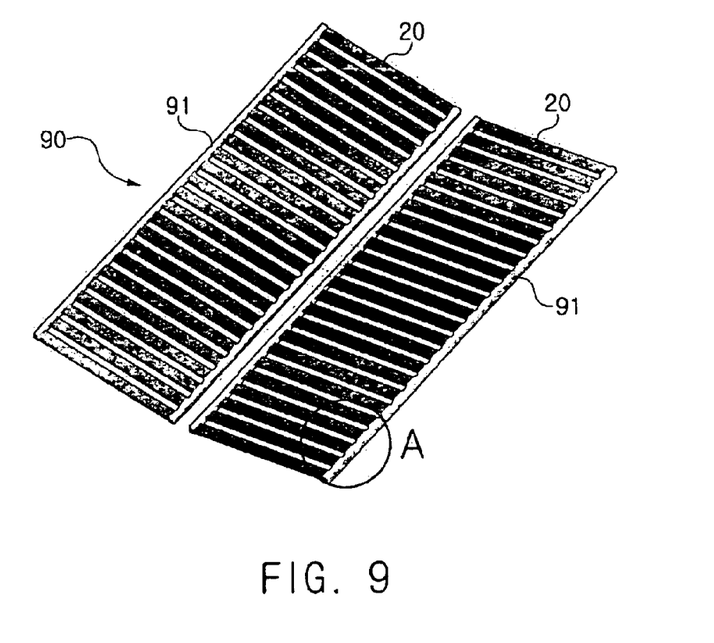
FIG. 9 is a disposable bamboo grid set of the third embodiment of the present invention.

As seen in FIGS. 7 and 8, another embodiment of the arch-shaped bamboo grid is presented. A second arch-shaped bamboo grid (70) comprises a plurality of bamboo strips (20) and a grid mounting set (80) consisting of a rectangular steel frame (71) with a handle (72) and a pair of grid mounting plates (73) for mounting the bamboo strips (20). As seen in FIG. 8, a pair of grid mounting plates (73) made of stainless steel is located at opposite sides of the frame (71). The grid mounting plates (73) consist of a plurality of slots (76) and bamboo strip retainers (75). The rectangular frame (71) is slightly bent up from the center toward both long sides for collecting the oily fluid at the center. A cross rod (74) is located at the center of the short side of the rectangular frame (71) for tangentially retaining the bamboo strips (20). One end of the bamboo strips (20) is manually passed underneath the cross bar (74) and both ends of the bamboo strips (20) are slightly bent up to forcibly insert between the bamboo strip retainers (75). At this point, the inner surface of the natural bamboo is bent downward and the outer surface of the natural bamboo faces upward. As the cooking progresses, the bamboo strips have a tendency to move from side to side due to the shrinkage from the cooking heat. To prevent the unnecessary movement of the strips during broiling, the bamboo strips are fixedly retained by the strip retainers (75). The extracted oily or juicy fluid flows down to the lowest center part and the droplets fall into the oil-collecting pan.

As shown in FIGS. 9 through 16, another embodiment of a disposable bamboo grid is introduced. A set of disposable bamboo grids (90) comprises a plurality of bamboo strips (20) arranged in parallel at uniform intervals and a pair of U-shaped end retainers (91) for clamping the ends of the bamboo strips (20). The clearance between the arranged bamboo strips (20) is the same as or a little less than the width of the bamboo strips (20). The disposable bamboo grids (90) are pre-fabricated in the factory for ready use and vacuum packed to preserve the natural bamboo freshness.

Figure 10:
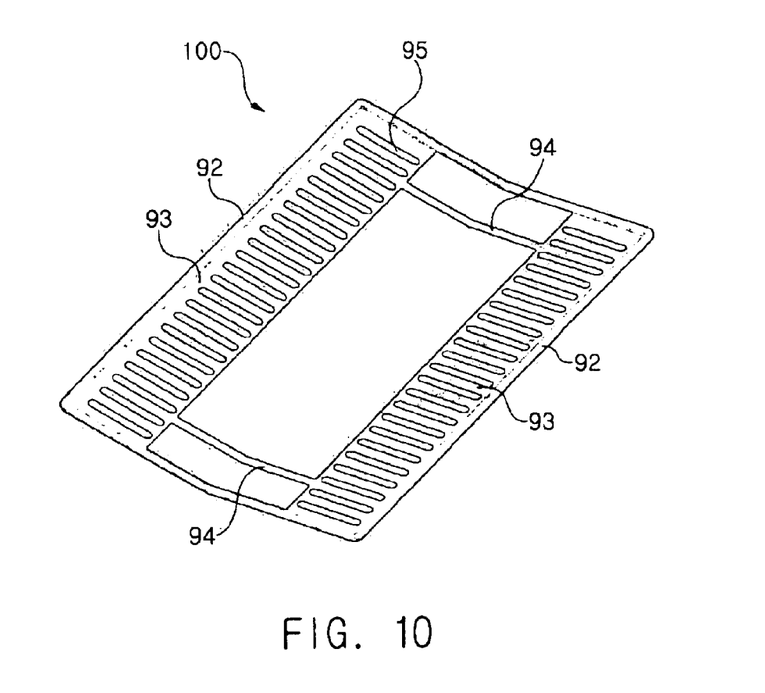
FIG. 10 is a bent down grid mounting set of the third embodiment of the present invention.
Figure 11:
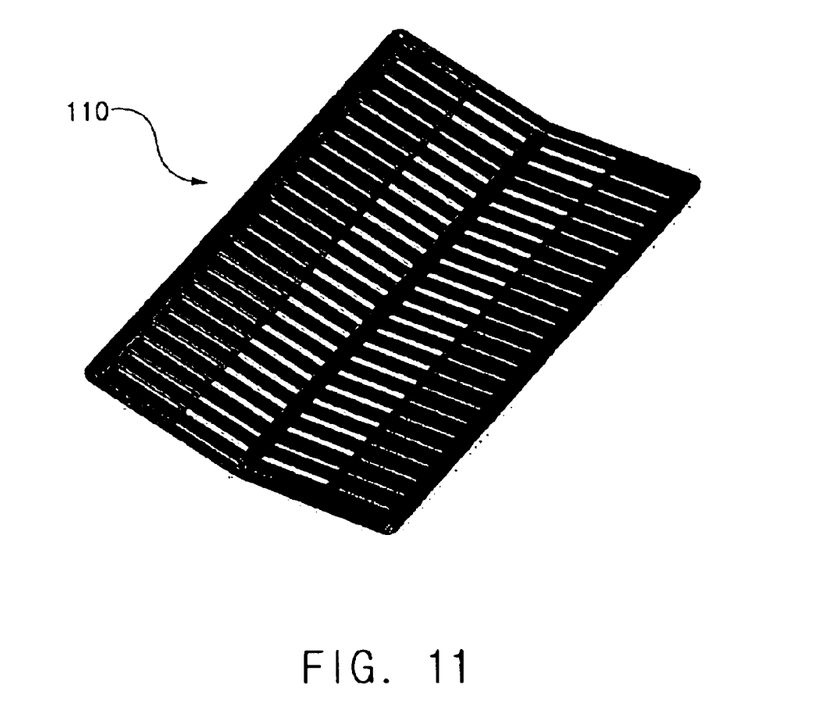
FIG. 11 is a semi-assembly of the disposable bamboo grid set mounted on the bent down grid mounting set.
Figure 12:
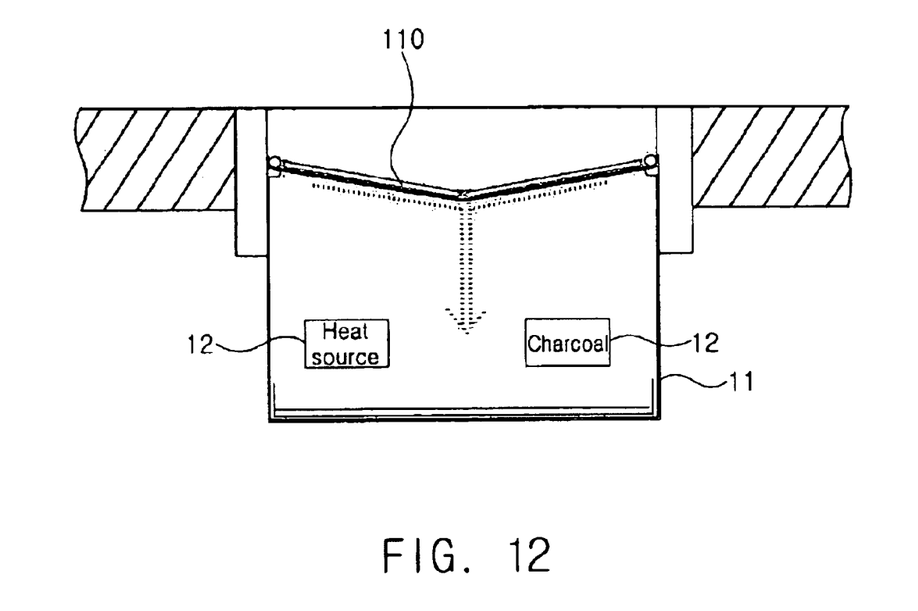
FIG. 12 is a conventional grill employing the disposable bent down bamboo grid set of the present invention.

As seen in FIG. 10, a bent down mounting set (100) is provided for mounting a set of disposable bamboo grids (90). The mounting set (100) comprises a steel frame (92), a pair of grid mounting plates (93) at opposite sides and braces (94) at both ends. As seen in FIG. 11, a set of disposable bamboo grids (90) is mounted on a bent down mounting set (100). As seen in FIG. 12, a set of disposable bamboo grids (90) mounted on a bent down mounting set (100) is installed on a BBQ grill to drain the greasy liquid at the center.

Figure 13:
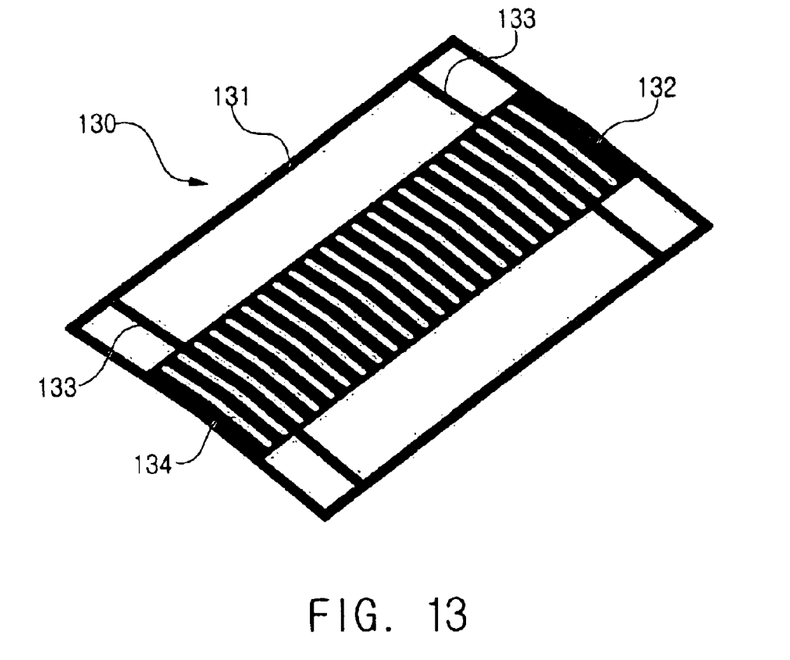
FIG. 13 is a bent-up grid mounting set of the fourth embodiment of the present invention
Figure 14:
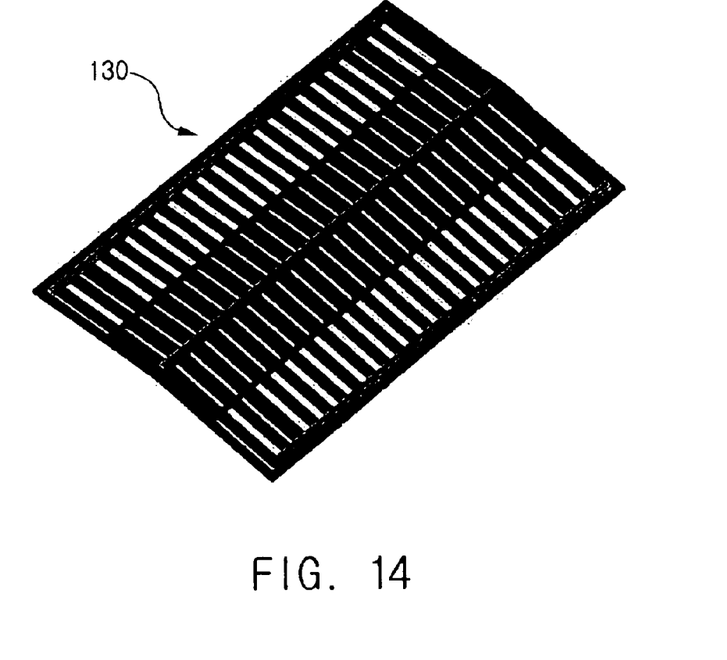
FIG. 14 is a semi-assembly of the disposable bamboo grid set mounted on the bent up grid mounting set.
Figure 15:
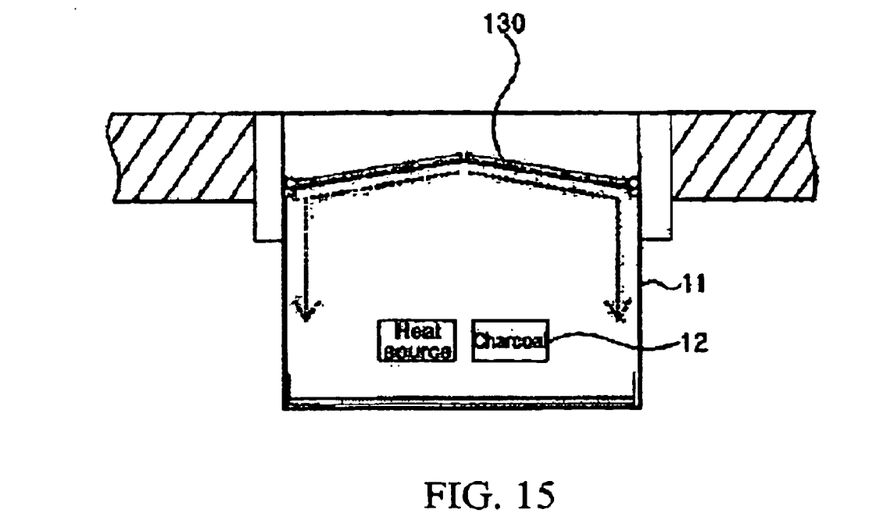
FIG. 15 is a conventional grill employing the disposable bent up bamboo grid set of the present invention.
Figure 16:
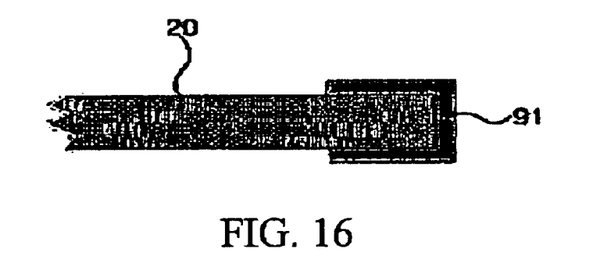
FIG. 16 is an enlarged drawing to illustrate the clamping of bamboo strip ends of the present invention.

As seen in FIG. 13, a bent up mounting set (130) is provided for mounting a set of disposable bamboo grids (90). The mounting set (130) comprises a steel frame (131), a bent-up mounting plate (132) at the top center and a pair of braces (133) at both sides. As seen in FIG. 14, a set of disposable bamboo grids (90) is mounted on a bent up mounting set (130). As seen in FIG. 15, a set of disposable bamboo grids (90) mounted on a bent up mounting set (130) is installed on a BBQ grill to drain the greasy liquid at both sides.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A barbeque grill having an oven lower part under a dining table, a pair of burning charcoal containers as a primary heat source, an oily liquid droplet collecting pan and a ventilation system comprises:

a grid set fabricated with a plurality of natural bamboo strips (20) arranged at constant intervals to a clamping means, said grid set forming an arch-shaped bamboo grid set (30), and a grid mounting set consisting of a metal frame and a pair of grid mounting plates for mounting said grid set, said grid mounting set forming a rectangular steel frame (71) with grid mounting plates (73), wherein said grid set fabricated from a plurality of bamboo strips (20) is disposable bamboo grid (90).

2. A barbeque grill as claimed in claim 1, wherein said grid set (60) having the arch-shaped bamboo grid set (30) and the grid mounting set (50) further comprises a plurality of bamboo strips (20), a pair of end retainers (31), a clip array (32), and said grid mounting set (50) having a rectangular steel frame (33), a pair of handles (35) and grid mounting plates (34) for mounting the bamboo grid (30).

3. A barbecue grill as claimed in claim 2, wherein said end retainers (31) made of stainless steel are formed into a U-shape for forcibly and tightly clamping both ends of said bamboo strips (20) to prevent unnecessary movement of said bamboo strips (20) during broiling.

4. A barbeque grill as claimed in claim 2, wherein said arch-shaped bamboo grid set (30) is assembled in the manner that the outer surface of the natural bamboo faces upward and the inner surface of the natural bamboo is bent downward and fixed to said clip array (32) at the center, said arch-shaped bamboo grid (30) is bent down at the center to collect the extracted oily and juicy fluid at the center bottom part and fall into an oil-collecting pan.

5. A barbeque grill as claimed in claim 1, wherein said grid mounting set (80) consists of the rectangular steel frame (71) with a handle (72) further comprises a pair of grid mounting plates (73) disposed at opposite ends of the longer side of the frame (71) for mounting the bamboo strips (20), a cross rod (74) located at the center of the shorter side of the frame (71), said grid mounting plates (73) having a plurality of slots (76) and bamboo strip retainers (75).

6. A barbeque grill as claimed in claim 5, wherein said rectangular steel frame (71) is slightly bent up from said cross bar (74) located at the center toward both grid mounting plates (73) disposed at opposite ends of the longer side of the frame (71), so that one end of said bamboo strips (20) is manually inserted underneath said cross bar (74) and both ends of said bamboo strips (20) are slightly bent up for forcibly inserting between said bamboo strip retainers (75) to form an arch-shape.

7. A barbeque grill as claimed in claim 6, wherein said plurality of strip retainers (75) fixedly retains the ends of said bamboo strips (20) to prevent unnecessary movement of said bamboo strips (20) during broiling.

8. A barbeque grill as claimed in claim 1, wherein said grill set in a pair of disposable bamboo grids (90) fabricated from a plurality of bamboo strips (20) arranged in parallel at uniform intervals to a pair of U-shaped end retainers (91) for clamping both ends of the bamboo strips (20) and vacuum packed to preserve the natural bamboo freshness for ready use.

9. A barbeque grill as claimed in claim 8, wherein said disposable bamboo grids (90) are mounted on a bent down mounting set (100) comprising a steel frame (92), a pair of grid mounting plates (93) at opposite sides and braces (94) at both ends.

10. A barbeque grill as claimed in claim 8, wherein said disposable bamboo grids (90) are mounted on a bent up mounting set (130) comprising a steel frame (131), a bent-up mounting plate (132) at the top center and a pair of braces (133) at both sides.

11. A barbeque grill as claimed in claim 1, wherein said natural bamboo is sliced to produce a narrow bamboo strip (20) with a dimension of approximately 6~10 mm (¼"~½") in width, 6 mm (¼") in thickness and 200~400 mm (8"~16") in length, and said bamboo strip surface may be carved with various decorative incisions not only for decorating, but also for extracting bamboo sap and allowing it to permeate into the cooking meet during broiling.

* * * * *